(12) United States Patent
Civlin

(10) Patent No.: US 7,318,222 B2
(45) Date of Patent: Jan. 8, 2008

(54) METHODS FOR EXECUTION CONTROL ACQUISTION OF A PROGRAM AND FOR EXECUTING AN OPTIMIZED VERSION OF A PROGRAM

(75) Inventor: Jan Civlin, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 795 days.

(21) Appl. No.: 10/650,190

(22) Filed: Aug. 27, 2003

(65) Prior Publication Data

US 2005/0050530 A1    Mar. 3, 2005

(51) Int. Cl.
*G06F 9/45* (2006.01)
(52) U.S. Cl. ............... 717/151; 717/128; 718/103; 718/108; 711/128; 714/47
(58) Field of Classification Search ........... 717/151, 717/128, 154; 718/103, 108; 711/128; 714/47
See application file for complete search history.

(56) References Cited

U.S. PATENT DOCUMENTS

| | | | | |
|---|---|---|---|---|
| 5,727,167 | A * | 3/1998 | Dwyer et al. | 710/100 |
| 6,018,759 | A * | 1/2000 | Doing et al. | 718/108 |
| 6,105,051 | A * | 8/2000 | Borkenhagen et al. | 718/103 |
| 6,112,317 | A * | 8/2000 | Berc et al. | 714/47 |
| 6,148,437 | A * | 11/2000 | Shah et al. | 717/128 |
| 6,185,581 | B1 * | 2/2001 | Garthwaite | 707/206 |
| 6,189,141 | B1 * | 2/2001 | Benitez et al. | 717/153 |
| 6,434,576 | B1 * | 8/2002 | Garthwaite | 707/206 |
| 6,463,582 | B1 * | 10/2002 | Lethin et al. | 717/158 |
| 6,567,839 | B1 * | 5/2003 | Borkenhagen et al. | 718/103 |
| 6,633,835 | B1 * | 10/2003 | Moran et al. | 702/190 |
| 6,684,298 | B1 * | 1/2004 | Dwarkadas et al. | 711/128 |
| 7,093,251 | B2 * | 8/2006 | Tsun et al. | 718/100 |
| 7,143,153 | B1 * | 11/2006 | Black et al. | 709/223 |
| 7,197,749 | B2 * | 3/2007 | Thornton et al. | 718/101 |

OTHER PUBLICATIONS

Dynamic Trace Selection Using Performaqnce monitoring Hardware Sampling, IEEE, Howard Chen et al, Mar. 2003, pp. 79-90.*

(Continued)

*Primary Examiner*—Todd Ingberg
(74) *Attorney, Agent, or Firm*—Martine Penilla & Gencarella, LLP

(57) ABSTRACT

In a method for execution control acquisition of a program, during the execution of the program, it is determined when a hardware performance counter has reached a threshold. When the threshold is reached, execution control is switched to a dynamic optimizer. Thereafter, an optimized version of the program is executed. In a method for executing an optimized version of a program, during execution of the optimized version, an interrupt is received and execution control is returned to an operating system. An original version of the program is then executed. During the execution of the original version, a hardware performance counter is monitored. When the hardware performance counter reaches a threshold during the execution of the original version, execution control is switched to a dynamic optimizer. Thereafter, the execution of the optimized version of the program is continued as directed by the dynamic optimizer.

18 Claims, 3 Drawing Sheets

OTHER PUBLICATIONS

Dror G. Feitelson, Job Scheduling in Multiprogrammed Parallel Systems Extended Version, IBM, Aug. 1997, pp. 1-51.*

Delivering Performance On Sun Optimizing Applications for Solaris, Technical White Paper, Sun Microsystems, 2000, 77 pages.*

Security Performance and Accounting Administration, SunSoft, 1994, 228 pages.*

Performance Tuning an Application, SunPro, 1993, Whole Manual.*

* cited by examiner

METHODS FOR EXECUTION CONTROL ACQUISTION OF A PROGRAM AND FOR EXECUTING AN OPTIMIZED VERSION OF A PROGRAM

CROSS REFERENCE TO RELATED APPLICATIONS

This application is related to the following applications: 1) U.S. application Ser. No. 10/371,383, filed on Feb. 21, 2003, now abandoned; and 2) U.S. application Ser. No. 10/633,108, filed on Aug. 1, 2003. The disclosures of these related applications are incorporated herein by reference.

BACKGROUND OF THE INVENTION

The present invention relates generally to computer systems and, more particularly, to a method for execution control acquisition of a program and a method for executing an optimized version of a program.

In the dynamic recompilation of programs, execution control acquisition from a program that cannot tolerate changes to its code is problematic. A simple solution to the problem would be to use the hardware interrupts to obtain execution control. If, however, the interrupt is set on the timer or other any other system resource that is not relevant to performance metrics, then significant performance degradation may occur due to the many unnecessary interrupts that are bound to the timer and therefore cannot be avoided. As the objective of dynamic recompilation often is to optimize the program for faster execution, such performance degradation is obviously not acceptable.

In view of the foregoing, there is a need for a method of execution control acquisition from a program that does not cause significant performance degradation.

SUMMARY OF THE INVENTION

Broadly speaking, the present invention fills this need by providing, among other things, a method for execution control acquisition of a program that uses a hardware performance counter. Computer readable media containing program instructions for execution control acquisition of a program also are provided.

In accordance with one aspect of the present invention, a method for execution control acquisition of a program is provided. In this method, a program is executed. During the execution of the program, it is determined when a hardware performance counter has reached a threshold. When the threshold is reached, execution control is switched to a dynamic optimizer. Thereafter, an optimized version of the program is executed.

In one embodiment, the execution of the program includes execution of the original binary code for the program. In one embodiment, the execution of the optimized version of the program includes the execution of an optimized binary code file for the program. In one embodiment, the hardware performance counter is one of an instruction counter, a cycle counter, and a cycles per instruction counter. In one embodiment, the hardware performance counter is integrated into a central processing unit.

In accordance with another aspect of the present invention, a method for executing an optimized version of a program is provided. In this method, an optimized version of a program is executed. During execution of the optimized version of the program, an interrupt is received and execution control is returned to an operating system. An original version of the program is then executed. During the execution of the original version of the program, a hardware performance counter is monitored. When the hardware performance counter reaches a threshold during the execution of the original version of the program, execution control is switched to a dynamic optimizer. Thereafter, the execution of the optimized version of the program is continued as directed by the dynamic optimizer.

In one embodiment, the execution of the optimized version of the program includes the execution of an optimized binary code file for the program. In one embodiment, the execution of the program includes execution of the original binary code for the program. In one embodiment, the hardware performance counter is one of an instruction counter, a cycle counter, and a cycles per instruction counter. In one embodiment, the threshold is set to a value that is indicative of unacceptable performance. In one embodiment, the hardware performance counter is integrated into a central processing unit.

In accordance with yet another aspect of the present invention, computer readable media containing program instructions for execution control acquisition of a program are provided. In one embodiment, the computer readable media includes program instructions for executing a program, program instructions for determining when a hardware performance counter reaches a threshold during the executing of the program, program instructions for switching execution control to a dynamic optimizer when the threshold is reached, and program instructions for executing an optimized version of the program.

In accordance with a further aspect of the present invention, computer readable media containing program instructions for executing an optimized version of a program are provided. In one embodiment, the computer readable media include program instructions for executing an optimized version of a program, program instructions for receiving an interrupt during execution of the optimized version of the program and returning execution control to an operating system, program instructions for executing an original version of the program, program instructions for monitoring a hardware performance counter during the executing of the original version of the program, program instructions for switching execution control to a dynamic optimizer when the hardware performance counter reaches a threshold during the executing of the original version of the program, and program instructions for continuing the executing of the optimized version of the program as directed by the dynamic optimizer.

It is to be understood that the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate exemplary embodiments of the invention and together with the description serve to explain the principles of the invention.

DETAILED DESCRIPTION OF EXEMPLARY EMBODIMENTS

Several exemplary embodiments of the invention will now be described in detail with reference to the accompanying drawings.

Figure 1:
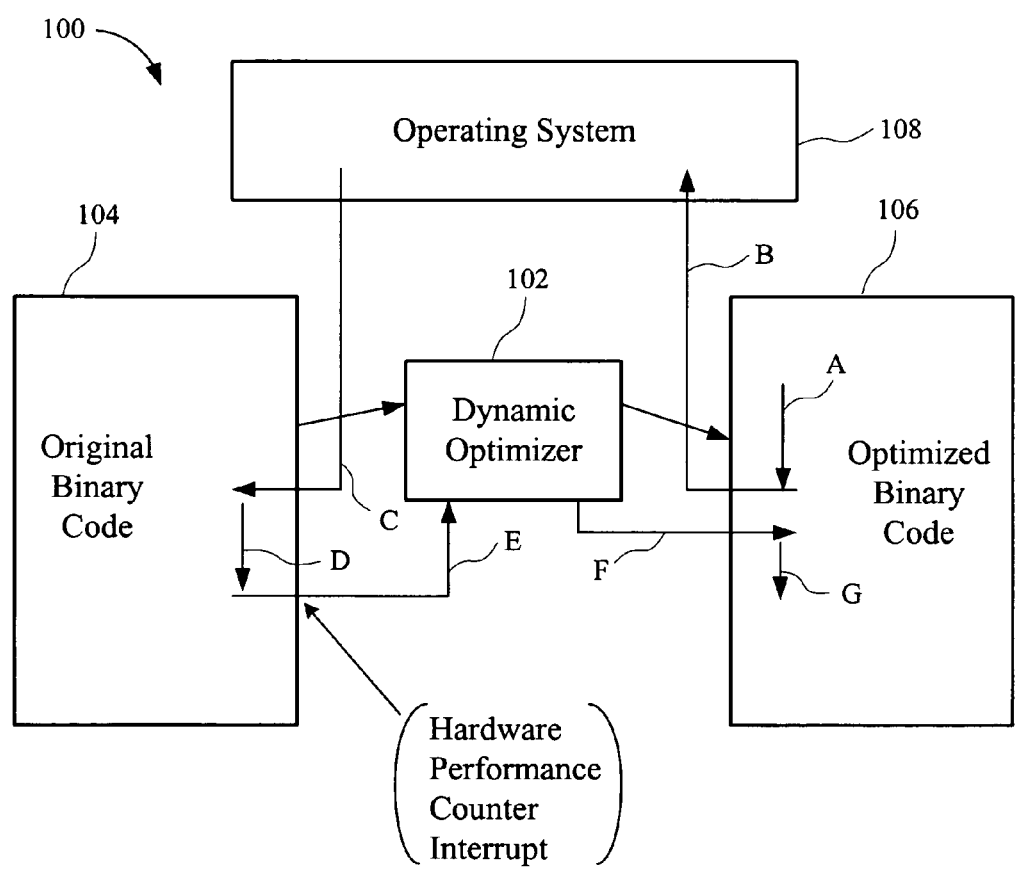
FIG. 1 is a schematic diagram that illustrates an exemplary execution of an optimized version of a program in accordance with one embodiment of the invention.

FIG. 1 is a schematic diagram 100 that illustrates an exemplary execution of an optimized version of a program in accordance with one embodiment of the invention. Referring to FIG. 1, dynamic optimizer (DO) 102 carries out the execution using original binary code 104 for a program and optimized binary code 106 for the program, as will be described in more detail below. The creation of optimized binary code 106 by an exemplary dynamic optimizer and additional details regarding the functionality of the dynamic optimizer are set forth in commonly owned U.S. application Ser. No. 10/633,108, filed on Aug. 1, 2003, the disclosure of which is incorporated herein by reference.

As shown in FIG. 1, DO 102 has passed execution control to optimized binary code 106 and the optimized binary code is executed along the process flow indicated by arrow A. During execution of optimized binary code 106, an exception occurs and this exception triggers an interrupt that passes execution control to operating system 108 (as indicated by arrow B). In some instances, operating system 108 may not be aware that it took control from optimized binary code 106. Thus, when operating system 108 redirects execution of the program, the operating system may return execution control to original binary code 104 (as indicated by arrow C). As original binary code 104 is executed along the process flow indicated by arrow D, a hardware performance counter will trigger a hardware interrupt, as will be explained in more detail below with reference to FIGS. 2 and 3. When this interrupt occurs, execution control switches to DO 102 (as indicated by arrow E) and DO 102 returns execution control to optimized binary code 106 (as indicated by arrow F) for continued execution of the program. Thereafter, execution of optimized binary code 106 continues along the process flow indicated by arrow G. When another exception that passes execution control to operating system 108 occurs, the above-described cycle of events will repeat itself.

As is known to those skilled in the art, hardware performance counters are special purpose registers that are provided in many known computer hardware architectures to enable hardware performance to be monitored. Hardware performance counters typically include two registers: a counter and a threshold. The value of the counter is continually updated by the operating system. The threshold has a constant value that cannot be changed by the operating system, but can be changed manually through the use of appropriate software.

To interrupt a program using a hardware performance counter, the threshold is adjusted to a desired value relative to the current value of the counter. When the current value of the counter reaches the threshold, the hardware performance counter gives rise to an interrupt, which interrupts the execution of the program and passes control to other software, e.g., a dynamic optimizer. Additional details regarding the use of hardware performance counters to interrupt a program are set forth in commonly owned U.S. application Ser. No. 10/371,383, filed on Feb. 21, 2003, the disclosure of which is incorporated herein by reference.

Figure 2:
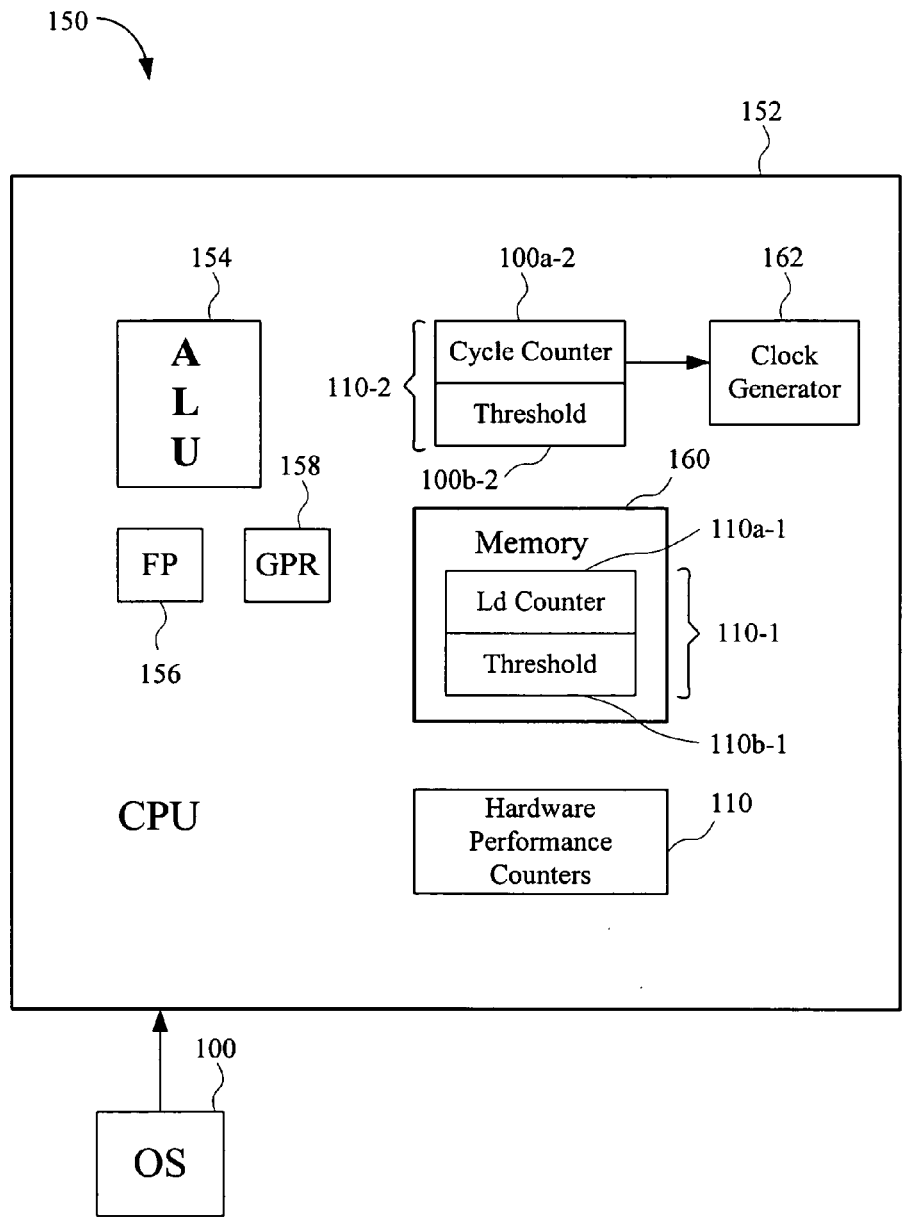
FIG. 2 is a simplified schematic diagram that shows a central processing unit (CPU) provided with hardware performance counters that may be used to implement the methods described herein.

FIG. 2 is a simplified schematic diagram 150 that shows an exemplary central processing unit (CPU) provided with hardware performance counters that may be used to implement the methods described herein. As shown in FIG. 2, central processing unit (CPU) 152 includes arithmetic logic unit (ALU) 154, floating point (FP) 156, general purpose registers (GPR) 158, memory 160, clock generator 162, and hardware performance counters 110. It is to be understood that any suitable CPU hardware configuration can be used and, therefore, the CPU may include more or less circuitry than shown in FIG. 2. As shown in FIG. 2, hardware performance counters 110 are indicated generally by the single block designated by reference numeral 110; however, those skilled in the art will understand that the specific hardware performance counters in an actual CPU are spread across the CPU so that each counter can collect different information. Hardware performance counters 110-1 and 110-2 shown in FIG. 2 illustrate locations of exemplary hardware performance counters. Hardware performance counter 110-1, which is used to monitor one aspect of the performance of memory 160, includes load counter 110a-1 and threshold 110b-1. Hardware performance counter 110-2 is coupled to clock generator 162 and includes cycle counter 110a-2 and threshold 110b-2.

Those skilled in the art will appreciate that the specific hardware performance counter used may be varied to suit the needs of particular situations. By way of example, the hardware performance counter may be an instruction counter, a cycle counter, a load counter, a D$-miss counter, an E$-miss counter, or an I$-miss counter. In addition, in hardware architectures that include such a counter, the hardware performance counter may be a cycles per instruction counter. Those skilled in the art will further appreciate that more than one hardware performance counter can be used.

The use of a hardware performance counter to trigger an interrupt will now be explained in terms of a simplified example. In this simplified example the instruction counter is used to trigger the interrupt after 1,000 instructions have been executed. First, a program binds the hardware interrupt with the threshold register and the instruction counter, sets the value of the threshold to 1,000, and resets the instruction counter. Thereafter, upon execution of the next 1,000 instructions, the threshold becomes equal to the value of 1,000 and the system gives rise to an interrupt. The interrupt routine performs any desired work, e.g., analyzing performance metrics, and then resets the instruction counter. After another 1,000 instructions have been executed, the interrupt process will be repeated again.

Figure 3:
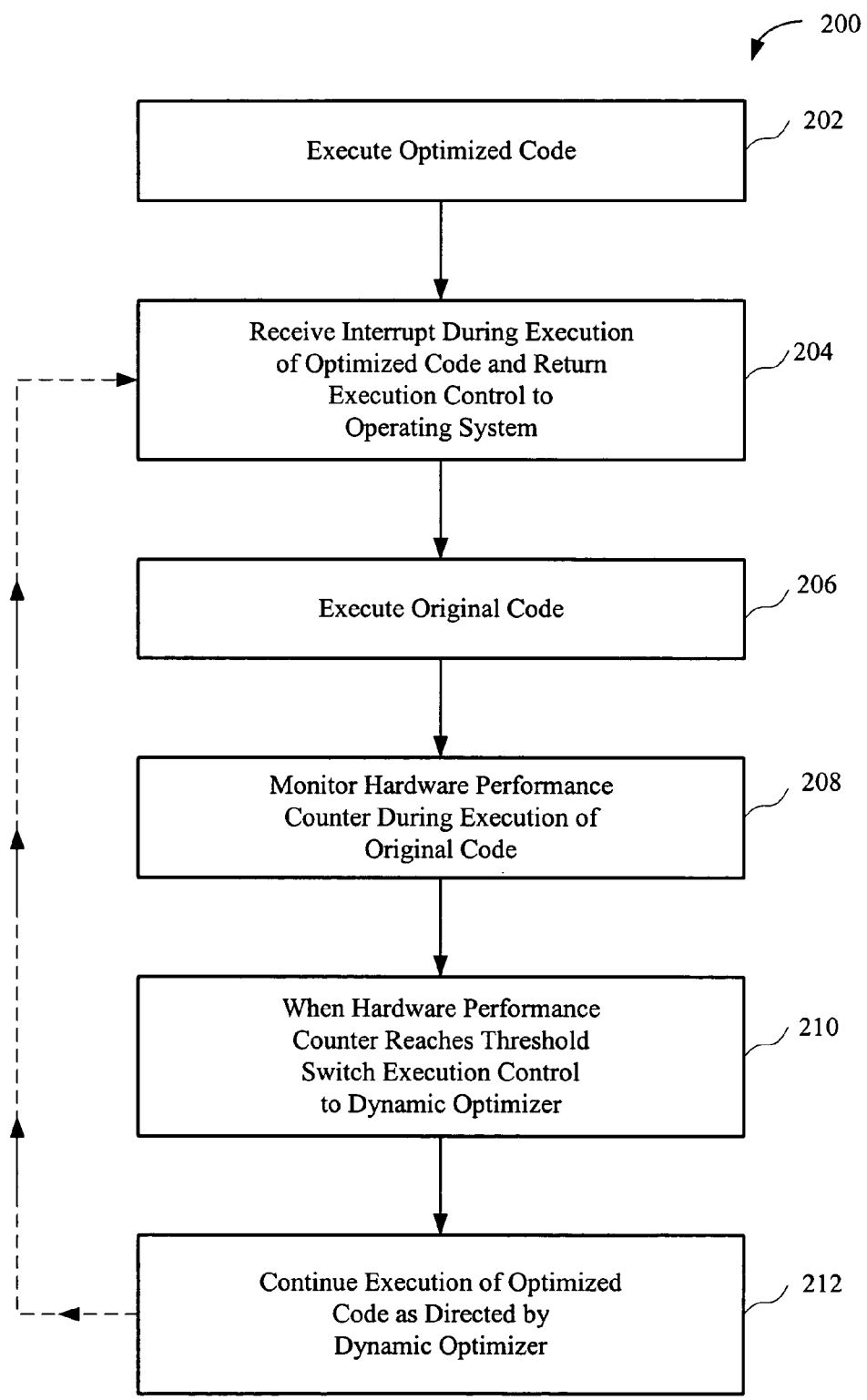
FIG. 3 is a flow chart diagram illustrating the method operations performed in the execution of an optimized version of a program in accordance with one embodiment of the present invention.

FIG. 3 is a flow chart diagram 200 illustrating the method operations performed in the execution of an optimized version of a program in accordance with one embodiment of the present invention. The method begins in operation 202 in which an optimized version of a program is executed. In one embodiment, the optimized version of the program is an optimized binary code file for the program. In operation 204, an interrupt is received during execution of the optimized version of the program and execution control is returned to the operating system. The interrupt may be triggered by any exception that may be part of the optimized version of the program or other external code, program, or hardware. The method continues in operation 206 in which an original version of the program is executed. As set forth above in connection with the description of FIG. 1, in some instances, the operating system may not be aware that it took control from the optimized version of the program. Thus, when the operating system redirects execution of the program, the operating system may return execution control to the original version of the program. In one embodiment, the original version of the program is the original binary code for the program.

In operation 208, a hardware performance counter is monitored during the execution of the original version of the program. The particular hardware performance counter used may be varied depending upon the performance metric being used to evaluate the performance of the execution of the original version of the program, and several exemplary hardware performance counters are listed above. If desired, more than one hardware performance counter can be monitored. The use of more than one hardware performance counter may be necessary when the performance metric being used is determined by a calculation based on the values of two or more counters. The hardware performance counter may be monitored by setting the threshold of the counter to a desired value relative to the value of the counter. In one embodiment, the threshold is set to a value that is indicative of unacceptable performance by the original version of the program. When the hardware performance counter reaches the threshold, in operation 210, execution control is switched to a dynamic optimizer. Switching execution control to the dynamic optimizer in this manner avoids unnecessary invocation of the system interrupts when the performance of the original version of the program is satisfactory and thereby helps to maintain the performance of the system on a high level. In operation 212, the execution of the optimized version of the program is continued as directed by the dynamic optimizer. In one embodiment, the dynamic optimizer returns execution control to the optimized binary code file for continued execution of the program. The execution of the optimized version of the program continues until another exception occurs, at which point the above-described sequence of method operations will be repeated.

Those skilled in the art will recognize that the order in which the method operations are performed may be varied from that described herein, e.g., by rearranging the order in which the method operations are performed or by performing some of the method operations in parallel. Further, while the present invention has been described in the general context of an application program that is executed on an operating system in conjunction with a test system, it should be appreciated that the invention may be implemented with other routines, programs, components, data structures, etc., which perform particular tasks or implement particular abstract data types. In addition, the present invention may be practiced with other computer system configurations including hand-held devices, microprocessor systems, microprocessor-based or programmable consumer electronics, minicomputers, mainframe computers, and the like.

With the embodiments described herein in mind, it should be understood that the present invention may employ various computer-implemented operations involving data stored in computer systems. These operations are those requiring physical manipulation of physical quantities. These quantities usually, but not necessarily, take the form of electrical or magnetic signals capable of being stored, transferred, combined, compared, and otherwise manipulated. Further, the manipulations performed are often referred to using terms such as producing, identifying, determining, or comparing.

Any of the operations described herein that form part of the present invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The present invention also can be embodied as computer readable code on a computer readable medium. The computer readable medium may be any data storage device that can store data which can be thereafter be read by a computer system. Examples of the computer readable medium include hard drives, network attached storage (NAS), read-only memory, random access memory, CD-ROMs, CD-Rs, CD-RWs, magnetic tapes, and other optical and non-optical data storage devices. The computer readable medium also can be distributed over network coupled computer systems so that the computer readable code is stored and executed in a distributed fashion.

In summary, the present invention provides a method for execution control acquisition of a program and a method for executing an optimized version of a program. The invention has been described herein in terms of several exemplary embodiments. Other embodiments of the invention will be apparent to those skilled in the art from consideration of the specification and practice of the invention. The embodiments and preferred features described above should be considered exemplary, with the invention being defined by the appended claims and equivalents thereof.

What is claimed is:

1. A method for executing an optimized version of a program, comprising: executing an optimized version of a program;
   receiving an interrupt during execution of the optimized version of the program and returning execution control to an operating system;
   executing an original version of the program;
   monitoring a hardware performance counter during the executing of the original version of the program;
   when the hardware performance counter reaches a threshold during the executing of the original version of the program, switching execution control to a dynamic optimizer; and
   continuing the executing of the optimized version of the program as directed by the dynamic optimizer.

2. The method of claim 1, wherein the executing of the optimized version of the program includes executing an optimized binary code file for the program.

3. The method of claim 1, wherein the executing of the original version of the program includes executing original binary code for the program.

4. The method of claim 1, wherein the hardware performance counter is selected from the group consisting of an instruction counter and a cycle counter.

5. The method of claim 1, wherein the hardware performance counter is a cycles per instruction counter.

6. The method of claim 1, wherein the threshold is set to a value that is indicative of unacceptable performance.

7. The method of claim 1, wherein the hardware performance counter is integrated into a central processing unit.

8. Computer readable media having encoded thereon a computer program including a set of program instructions for causing a computer to execute an optimized version of a program, the computer program comprising:
   program instructions for executing an optimized version of a program;

program instructions for receiving an interrupt during execution of the optimized version of the program and returning execution control to an operating system;

program instructions for executing an original version of the program;

program instructions for monitoring a hardware performance counter during the executing of the original version of the program;

program instructions for switching execution control to a dynamic optimizer when the hardware performance counter reaches a threshold during the executing of the original version of the program; and program instructions for continuing the executing of the optimized version of the program as directed by the dynamic optimizer.

9. The computer readable media of claim 8, wherein the executing of the optimized version of the program includes executing an optimized binary code file for the program.

10. The computer readable media of claim 8, wherein the executing of the original version of the program includes executing original binary code for the program.

11. The computer readable media of claim 8, wherein the hardware performance counter is selected from the group consisting of an instruction counter, a cycle counter, and a cycles per instruction counter.

12. The computer readable media of claim 8, wherein the threshold is set to a value that is indicative of unacceptable performance.

13. A method for executing an optimized version of a program, comprising:

executing an optimized binary code file for a program;

receiving an interrupt during execution of the optimized binary code file for the program and returning execution control to an operating system;

executing original binary code for the program;

monitoring a hardware performance counter during the executing of the original binary code for the program;

when the hardware performance counter reaches a threshold that is indicative of unacceptable performance during the executing of the original binary code for the program, switching execution control to a dynamic optimizer; and continuing the executing of the optimized binary code file for the program as directed by the dynamic optimizer.

14. The method of claim 13, wherein the hardware performance counter is selected from the group consisting of an instruction counter and a cycle counter.

15. The method of claim 13, wherein the hardware performance counter is a cycles per instruction counter.

16. The method of claim 13, wherein the hardware performance counter is integrated into a central processing unit.

17. Computer readable media having encoded thereon a computer program including a set of program instructions for causing a computer to execute an optimized version of a program, the computer program comprising:

program instructions for executing an optimized binary code file for a program;

program instructions for receiving an interrupt during execution of the optimized binary code file for the program and returning execution control to an operating system;

program instructions for executing original binary code for the program;

program instructions for monitoring a hardware performance counter during the executing of the original binary code for the program;

program instructions for switching execution control to a dynamic optimizer when the hardware performance counter reaches a threshold that is indicative of unacceptable performance during the executing of the original binary code for the program; and program instructions for continuing the executing of the optimized binary code file for the program as directed by the dynamic optimizer.

18. The computer readable media of claim 17, wherein the hardware performance counter is selected from the group consisting of an instruction counter, a cycle counter, and a cycles per instruction counter.

* * * * *